(12) United States Patent
Erick

(10) Patent No.: US 6,345,233 B1
(45) Date of Patent: Feb. 5, 2002

(54) COLLISION AVOIDANCE USING GPS DEVICE AND TRAIN PROXIMITY DETECTOR

(75) Inventor: Jack M. Erick, Amarillo, TX (US)

(73) Assignee: Dynamic Vehicle Safety Systems, Ltd., Amarillo, TX (US)

(*) Notice: Subject to any disclaimer, the term of this patent is extended or adjusted under 35 U.S.C. 154(b) by 0 days.

(21) Appl. No.: 09/485,956

(22) PCT Filed: Aug. 18, 1998

(86) PCT No.: PCT/US98/17099

§ 371 Date: Jun. 16, 2000

§ 102(e) Date: Jun. 16, 2000

(87) PCT Pub. No.: WO99/09429

PCT Pub. Date: Feb. 25, 1999

Related U.S. Application Data (60) Provisional application No. 60/055,998, filed on Aug. 18, 1997.

(51) Int. Cl.[7] .............................. B61L 1/10; B61L 23/00; G08G 1/01
(52) U.S. Cl. ...................... 701/301; 340/933; 340/901; 701/19
(58) Field of Search .................. 701/301, 19; 340/933, 340/903, 901, 902, 980, 500, 825, 49; 246/122 R, 293, 473.1

(56) References Cited

U.S. PATENT DOCUMENTS

| | | | |
|---|---|---|---|
| 3,758,775 A | 9/1973 | Hopkins | 246/125 |
| 4,942,395 A * | 7/1990 | Ferrari et al. | 340/907 |
| 5,554,982 A | 9/1996 | Shirkey et al. | 340/903 |
| 5,574,469 A | 11/1996 | Hsu | 342/455 |
| 5,602,739 A | 2/1997 | Haagenstad et al. | 364/436 |
| 5,620,155 A | 4/1997 | Michalek | 246/121 |
| 5,680,120 A * | 10/1997 | Tilleman | 340/904 |
| 5,699,986 A | 12/1997 | Welk | 246/125 |
| 5,739,768 A * | 4/1998 | Lane et al. | 340/933 |
| 5,740,547 A * | 4/1998 | Kull et al. | 701/19 |
| 5,786,750 A * | 7/1998 | Cooper | 340/425.5 |
| 5,864,304 A * | 1/1999 | Gerszberg et al. | 340/903 |
| 5,986,547 A * | 11/1999 | Korver et al. | 340/500 |

* cited by examiner

Primary Examiner—Tan Nguyen
Assistant Examiner—Dalena Tran
(74) Attorney, Agent, or Firm—Chauza & Handley, L.L.P.

(57) ABSTRACT

A processor (12) located on a vehicle processes GPS coordinates input thereto to provide an area of protection around the vehicle. Railroad grade crossing data (82, 84) stored in a data base (30) is read therefrom to ascertain whether a grade crossing is within the area of protection. If so, heading data (86) stored in association with the grade crossing data (82, 84) is compared with the heading of the vehicle to determine if the vehicle is on a road that intersects the grade crossing. If so, a first level alert is provided to the vehicle operator. If, in addition, a train is in the vicinity of the crossing, a second level alert is provided to the operator of the vehicle.

23 Claims, 3 Drawing Sheets

| MPH | VOLTAGE | DITHER NUMBER |
|---|---|---|
| 0-39 | 0-.1 | .001 |
| 40-59 | .11-.2 | .002 |
| 60-79 | .21-.3 | .003 |
| >80 | >.31 | .004 |

FIG. 5

COLLISION AVOIDANCE USING GPS DEVICE AND TRAIN PROXIMITY DETECTOR

This application is a national stage of PCT/US98/17099 filed Aug. 18, 1998 which claims benefit of Provisional Appln. No. 60/055,998 filed Aug. 18, 1997.

BACKGROUND OF THE INVENTION

There is an increasing concern with the number of accidents at railroad crossings. Collisions with trains are generally catastrophic, in that the destructive forces of a train are usually no match for any other type of vehicle. Indeed, federal and state regulations require that many types of vehicles, termed "priority vehicles", take special precautions before crossing a "grade" railroad crossing. For example, school buses, hazardous cargo carriers and other emergency vehicles are often required to stop at railroad crossings and verify the absence of an oncoming train before proceeding. A "grade" railroad crossing is where a motor vehicle highway, street or road directly intersects a railroad track. An intersection of a highway and a train track that involves an overpass is not a "grade" crossing, as no collision would occur even if the vehicle and train arrived at the same location at the same time.

The safety at railroad crossings has become of such significance that new federal agencies and studies have been undertaken to improve the grade crossing safety procedures. In view that a substantial number of fatalities occur every year due to collisions with trains, there has been an increased endeavor to provide sensors and detectors to warn oncoming traffic of the proximity of an approaching train. U.S. Pat. No. 5,739,768 describes a train proximity detector that provides a sensory indication to an operator when the vehicle and the train are located proximate each other. The train proximity detector of such patent receives the unique frequency transmitted by the train from the head end to the last car thereof The carrier frequency transmitted by the train is decoded to identify certain data in the frame of transmitted data to thereby verify that the transmission originated from a train. While the train proximity detector functions very efficiently for its intended purpose, the operator of the vehicle will be given a warning of the proximity of the train, even if the train and vehicle are not on a collision course. For example, if the train and the car are traveling together, but in parallel paths, and there is no intersection between the road and the railroad track, the operator of the vehicle is nevertheless warned about the proximity of the train.

Other suggested devices attempt to overcome this problem, but at the expense of additional complexity, cost and apparatus that is required to be added to the equipment of the train. For example, in U.S. Pat. No. 4,942,395, by Ferrari, the train transmits on a first frequency to a receiver located at an intersection, and a second frequency is transmitted from a transmitter at the crossing to oncoming vehicles. In this manner, the vehicles do not directly receive the train transmission, and the vehicles are only provided a warning when in the proximate vicinity of the railroad crossing.

U.S. Pat. No. 5,554,928 by Shirkey et al. discloses a wireless train proximity alert system in which both a locomotive and vehicle rely on GPS coordinates for proper operation. In this system, the locomotive computes the train speed based on the GPS coordinates and transmits the coordinates and the train speed to a grade crossing transceiver. The grade crossing transceiver receives such information and computes an estimated time of arrival of the train. When the estimated time of arrival is within about 20–30 seconds of the grade crossing, the grade crossing transceiver transmits the coordinates of both the crossing and a boundary warning zone. A receiver mounted in a vehicle receives the coordinates of the grade crossing as well as the coordinates of the boundary warning zone around the grade crossing. In addition, the vehicle itself has a GPS receiver for receiving the coordinates of the vehicle. A controller determines if the vehicle is then within the boundary of the warning zone. If so, the controller determines if the vehicle is within a predetermined range of the crossing and if so, an alarm signal is provided. The predetermined range calculated by the vehicle controller is dependent upon vehicle speed and the braking distance of the vehicle which is a function of the type of vehicle.

Many other types of vehicle and train proximity detectors are proposed in the prior art. Many of the proposed techniques involve complicated and expensive equipment that must be added either to the train or to the vehicle, or both. It can be appreciated that in order for train proximity detectors to be installed on vehicles, in general, the equipment must be efficient, reliable and cost effective.

From the foregoing, it can be seen that a need exists for an improved train proximity detector that utilizes currently available resources to provide an operator of a vehicle with a sensory indication when the vehicle is in the vicinity of the train, and on a collision course therewith. Another need exists for an improved train proximity detector that relies on the presence of a train by conventional transmissions therefrom, as well as relies on global positioning satellite (GPS) data for determining the location and direction of travel of the vehicle, whereby when such data is processed, it can be determined whether the vehicle is on a collision course with the train. A subsidiary need exists for a train proximity detector that has available data identifying each grade railroad crossing and corresponding compass bearing data of the roads crossing the railroad track.

SUMMARY OF THE INVENTION

In accordance with the principles and concepts of the invention, there is disclosed an improved train proximity detector that substantially reduces or overcomes the problems and disadvantages of the prior art devices.

In accordance with a preferred embodiment of the invention, disclosed is a train collision avoidance system that not only determines if a train is in the vicinity of the vehicle, but also if the train and the vehicle are both moving toward a common intersection where a collision would be inevitable. In the preferred form of the invention, the train collision avoidance system includes a first processor for receiving GPS longitude/latitude parameters to define the location of the vehicle. The first processor also includes as an input a compass or bearing for providing the direction of travel of the vehicle. Lastly, the first processor has access to a data base memory storing railroad grade crossing locations. The grade crossing location data stored in the data base is associated with heading or bearing information of all roads that intersect the railroad tracks. Operating in conjunction with the first processor is a second processor that detects the proximity of the train. The second processor is fully disclosed in U.S. Pat. No. 5,739,768, and is coupled to the first processor by an I/O bus. The train proximity detector is sensitive to train transmissions within about at least 1500–2000 feet from the train.

The GPS longitude/latitude coordinates of the vehicle are processed by the first processor to undergo a ranging function. The ranging function involves the elimination of various least significant digits of the longitude and latitude coordinates, thereby providing an area of protection around the vehicle of, for example, 800 meters. Next, the first processor searches through the data base memory to find all the grade crossing locations that fall within the protection area situated about the vehicle. If no affirmative grade crossing is found in the data base, then the first processor continues by receiving another GPS longitude/latitude coordinate and compass bearing parameter and undergoes the same processing. If a grade crossing is found in the data base memory to be within the area of protection around the vehicle, then the first processor determines if the vehicle is on the same heading as the road that intersects the railroad tracks. This is accomplished by comparing the vehicle bearing with the direction data stored in association with the grade crossing data stored in the data base. If a match is found as a result of this second comparison, a signal is provided on the I/O bus connected to the second processor. The second processor is programmed to determine if a train is in the proximate area of the vehicle by sensing whether any train is transmitting on its allocated frequency. If no train is transmitting on its frequency, then a first level, or alert indication is provided to the operator of the vehicle. In the event that the second processor has indeed detected the presence of a train in the vicinity of the vehicle, then a second level, or warning is provided to the operator of the vehicle. The first and second levels constitute different visual and audible signals to the vehicle driver to provide the requisite significance of the situation.

In other variations of the invention, the area of protection about the vehicle can be a function of the speed of the vehicle. In other words, if the vehicle speed is greater than a threshold speed, then the area of protection automatically increases.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts, elements or functions throughout the views, and in which.

DETAILED DESCRIPTION OF THE INVENTION

Figure 1:
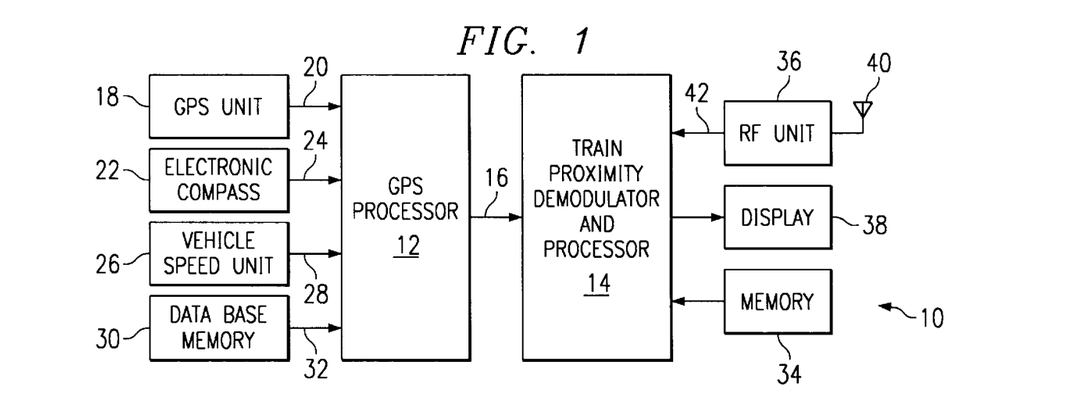
FIG. 1 is a detailed block diagram of the train collision avoidance system constructed in accordance with the preferred embodiment.

FIG. 1 illustrates in block diagram form a train collision avoidance system 10 constructed in accordance with the preferred embodiment of the invention. The system includes a first processor 12 and a second processor 14, each coupled together by an I/O bus 16. The first processor 12 has as a first input latitude and longitude coordinates provided by a GPS unit 18. The latitude/longitude parameters are coupled from the GPS unit 18 to the GPS processor 12 by way of an RS-32 bus 20. The GPS unit 18 can be of many conventional varieties that provide common output protocols, such as NMEA 0183. For example, GPS units are available that rely on three satellites to provide position data accurate to within about 100 meters. Other, more expensive, GPS units are available which rely on up to twelve satellites to provide a higher degree of accuracy, many within several feet. In addition, many automobiles are presently provided with GPS units coupled to mobile telephones for communicating information to centralized stations such as the location of an accident, the location when a call from the mobile telephone was initiated, etc. Such units are provided with an RS-232 output for providing longitude and latitude coordinate information.

The GPS processor 12 also receives compass bearing parameters provided by an electronic compass 22. The electronic compass 22 is coupled to the GPS processor 12 by an I/O bus 24. The electronic compass 22 can be of a variety of designs that are commercially available, such as the Pewatron 6945 digital compass. Preferably, the output of the electronic compass 22 is a data string representative of the primary eight directions, namely, N, NE, E, SE, etc.

The GPS processor 12 is coupled to a speed indicator 26 of the vehicle to provide data related to the speed of the vehicle. The vehicle speed unit 26 is coupled to the GPS processor 12 by an I/O bus 28.

Lastly, a data base memory 20 is coupled to the GPS processor 12 by a multi-bit data bus 32. The data base memory 30 is preferably of a non-volatile type, such as a EEPROM. The data base memory 30 is for storing data of all of the grade railroad crossings. The particular data stored in the memory 30 comprises a register string that includes a crossing position string and a heading string, both of which will be described in detail below. While not shown, the GPS processor 12 also includes 1M byte of cache memory.

As noted above, the GPS processor 12 is coupled to the train proximity and demodulator processor 14 by an I/O bus 16. The train proximity processor 14 has coupled thereto a memory 34, an RF unit 36 and a display 38. The RF unit 36 includes an antenna 40 for receiving transmission by locomotives, trains and the like. It is noted that only specified frequencies are allocated by governmental agencies for the transmission by trains between the head end thereof and the last car. The transmission between the engine and the last car of a train is necessary to provide information, such as brake pipe pressure, etc. The RF unit 36 is designed and tuned to receive the specific frequency allocated to trains. When the carrier frequency is received, the RF unit 36 couples a corresponding signal to the demodulator and processor 14 by way of line 42. A display 38 is driven by the demodulator and processor 14 to provide an operator of the vehicle both a visual and audio indication of the proximity of the train, and that the vehicle is on a collision course with the train. The train proximity demodulator and processor 14, the RF unit 36 and the display 38 are described in more detail in U.S. Pat. No. 5,739,768, the entire disclosure of which is incorporated herein by reference.

Briefly described, the train collision avoidance system 10 operates in the following manner. Periodically, GPS coordinates are provided by the GPS unit 18 to the GPS processor 12. The longitude and latitude coordinates provided by the GPS unit 18 uniquely identify the geographical location of the vehicle to which the train collision avoidance system 10 is associated. The GPS processor 12 also receives vehicle heading information and speed information respectively from the electronic compass 22 and the vehicle speed unit 26. The GPS processor 12 then processes the longitude and latitude coordinates of the vehicle to expand the same so as to provide a radius or area of protection around the vehicle. The GPS processor 12 then reads the data base memory 30 with regard to the grade crossing coordinates to determine if any of the coordinates fall within the area of protection. If so, the processor 12 then further determines whether the heading of the vehicle coincides with the direction of the road that intersects the railroad crossing. As noted above, the heading of the road that intersects the tracks at the grade crossing is stored in the data base in association with the grade crossing coordinate data. If either of these comparisons are negative, the GPS processor 12 returns to process a subsequent GPS coordinate of the vehicle. If, on the other hand, both comparisons are in the affirmative, it is next determined whether a train has been detected in the proximity of the grade crossing. If no train is detected, the train collision avoidance system 10 nevertheless provides the operator of the vehicle an alert signal and a corresponding audio sound. If a train is indeed detected in the proximity of the grade crossing, then a warning and associated audio sound are provided to the operator of the vehicle. The alert and warning indications and sounds are different, thereby allowing the operator of the vehicle to easily ascertain the degree of significance of caution that should be exercised at the grade crossing.

Reference is now made to FIGS. 2–5 for a detailed description of the invention. In particular, FIGS. 3a and 3b illustrate the programmed operation of the GPS processor 12. The GPS processor 12 is the same type of PIC controller as utilized in the train proximity detector. The compiler utility utilized in the programming of the GPS processor 12 is the Microchip MPLAB C-17 version 2.0. The language utilized to program the GPS processor 12 is the C language. In accordance with the preferred embodiment, it is determined whether the GPS processor 12 has received a new frame of longitude and latitude coordinates of the vehicle. This is shown in decision block 50 of FIG. 3a. As noted above, GPS units are available in many different varieties, many of which can provide location coordinates every one-two seconds. GPS coordinates are transferred as a serial string from the GPS unit 18 in an asynchronous manner on the RS-232 bus 20, to the GPS processor 12. In the event a new GPS frame of longitude and latitude coordinates has been received, processing branches from decision block 50 to program flow block 52 to start a timer. The GPS processor 12 maintains a timer of a predefined time period, such as five seconds. The utilization of a software timer assures that the GPS unit 18 is operating properly. If, for example, no frame of vehicle location data has been received, processing branches from decision block 50 to decision block 54 where it is determined whether the timer has expired. If the timer has not expired, processing branches back to the input of decision block 50. If, on the other hand, the timer has expired, processing branches from decision block 54 to program flow block 56 where the output of the GPS processor 12 is driven to a logic high. As noted in FIG. 1, the output of the GPS 12 processor is coupled to the train proximity demodulator and processor 14 by the I/O bus 16.

In the preferred form of the invention, the software of the train demodulator and processor 14 is modified somewhat from that described in U.S. Pat. No. 5,739,768, to identify the logic level on I/O input 16. If the logic level on I/O bus 16 is at a high level, the train proximity demodulator and processor 14 next determines whether a train is the proximity of the vehicle. This is shown in decision block 58 of FIG. 3a. As fully described in the noted patent, the RF unit 36 is a narrow band receiver for receiving the carrier frequency specified for locomotive and train operations. As is well known, the head end transmitter of a train periodically transmits information to the transreceiver located on the last car of the train to determine various parameters of the train operation. The last car of the train is also equipped with a transmitter for responding to the head end transceiver concerning the various parameters involved. Nevertheless, the train proximity modulator and processor 14 receives the transmission from the train, when such train is within 1500 feet or so of the collision avoidance system 10. Once the processor 14 determines that a bona fide train transmission has occurred, and has been received, further processing is carried out. Indeed, if no train is in the proximity of the collision avoidance system 10, then processing branches from decision block 58 back to the input of decision block 50. If the train proximity demodulator and processor 14 determines that a train is in the vicinity of the collision avoidance system 10, then processing branches to program flow block 60. Here, a warning and audio signal are provided by the processor 14.

In the preferred form of the invention, the display 38 includes a visual indication for an alert and a different visual indication for a warning. The visual indication for an alert is a symbol much like the circular railroad crossing sign, with a double "R". Two yellow indicators in the symbol flash in unison to indicate the visual alert. The audio sound comprises an 800 and 1300 Hertz tones that alternate for two seconds. The audio sound level is 15 db above an ambient level of the vehicle. As the ambient sound level of the vehicle increases, the volume of the audio sound correspondingly increases, up to 105 db. With regard to the warning indication, the symbol on the display 38 comprises a cross bar, with the words "railroad" and "crossing" on the cross bar. In addition, two red LEDs located below the cross alternately blink. Again, the audio sound is similar to that of the alert but lasts for eight seconds. In both the alert and warning indications, the audio sound is only active for a short time, and thereafter is automatically removed. Once an alert or warning is given to the vehicle operator, it proceeds through the cycle, even if the parameters input to the system change so that a collision is not thereafter possible. The alert and warning indications remain active for at least five seconds, and then extinguish if there is no longer the danger of a potential collision.

With reference again to FIG. 3a, from program flow block 60, processing returns to decision block 50. Assuming that, as a result of decision block 50, a new GPS frame of coordinates has been received, and the timer has been started according to block 52, processing proceeds to block 62, where the vehicle position is qualified. Here, the position of the vehicle is time qualified, in that the position coordinates of the vehicle are within the time constraints of the timer, and are considered to be valid. Alternatively, those skilled in the art can conduct preliminary processing on the longitude and the latitude coordinates of the vehicle by verifying that such coordinates are within allowable ranges. For example, any valid latitude coordinate on the earth must be between 0° and 90° North and South. In like manner, any valid longitude coordinate on the earth must be between 0° and 180° East and West. As is well known, 0° longitude exists at the Prime Meridian (Greenwich), and 180° exists at the international date line. As yet another alternative, those skilled in the art may prefer to temporarily store the previous coordinates, or an average of the previous coordinates, and verify that the present coordinates do not significantly vary therefrom. In any event, after the vehicle position is qualified, the speed and direction of travel of the vehicle are obtained by the GPS processor 12, as shown in program flow block 64. The speed and direction of travel parameters are obtained respectively from the vehicle speed unit 26 and the electronic compass 22.

Depending upon the speedometer utilized, the speed parameter can be digital, analog or another type of signal which can be readily converted to digital form, if necessary, and processed by the GPS processor 12. In the preferred embodiment, the speed parameter of the vehicle is an analog voltage that corresponds to the actual speed of the vehicle. The direction of travel parameter from the electronic compass 22 can be an analog voltage, digital signals or other signals that are representative of the eight-point cardinal system, which is N, NE, E, SE, S, etc. Next, the GPS processor 12 accesses a table shown in FIG. 5 for correlating the vehicle speed to a dither number. As noted above, an analog voltage is coupled from the vehicle speed unit 26 via line 28, to the GPS processor 12. The GPS processor 12 includes an internal A/D converter for converting the analog voltage to corresponding digital signals. As noted in FIG. 5, the speed of the vehicle linearly corresponds to an analog voltage. The table assigns a specified dither number to the four ranges of speed. As can be seen, for lower speeds, the dither number is lower, as compared to the higher speeds. While only four different levels of speed are employed, those skilled in the art may prefer to utilize fewer or a greater number of speed levels and corresponding dither numbers.

Figure 2A:
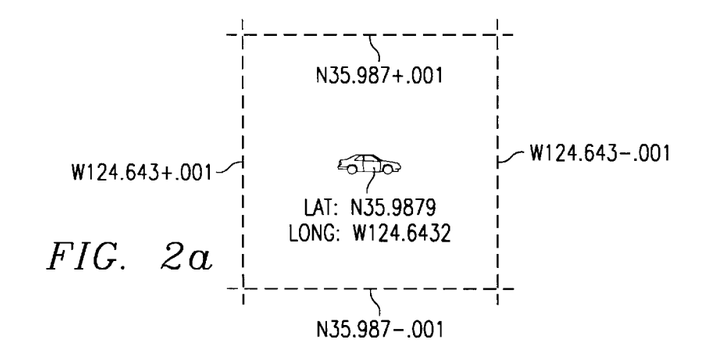
FIGS. 2a and 2b are diagrams showing the area of protection of a vehicle based on the least significant digits of the longitude and latitude coordinates that are used.

In program flow block 68, the latitude and longitude coordinates are dithered according to the dither number of Table 5. In the dithering of the location coordinates of the vehicle, the fourth least significant bit of both the longitude and the latitude coordinates is dropped. For instance, and as noted in FIGS. 2a and 2b, it is assumed for purposes of example that the location of the vehicle is specified by a latitude of N35.9879 and longitude of W124.6432. In the United States, the latitude is "North", and the numbers are "35" the degrees, the "98" are the minutes, the "79" are the seconds and the "85" is a further division of the seconds. A similar designation is used with the longitude coordinates except the degrees are either "West" or "East". In the dithering operation, the fourth least significant bits of the latitude and longitude coordinates are dropped, thereby leaving the resulting coordinates N35.987 and W123.643. If, for example, the speed of the vehicle is 35 miles per hour, then according to the table of FIG. 5, the dither number would 0.001. In dithering the vehicle location, the value 0.001 is both added and subtracted from the truncated longitude and latitude coordinates. As shown in FIG. 2a, as a result of the dithering operation, the range of the longitude coordinates becomes W124.642 through W124.644. In like manner, the range of the latitude coordinates becomes N35.986 through N35.988. These ranges of both latitude and longitude define an area of protection around the vehicle shown by the broken lines. While the area of protection is actually rectangular or square, such area is sometimes termed herein as a "radius" of protection around the vehicle. By changing the third least significant digit of the latitude by the value 0.001, the space between the broken lines of the latitude coordinates is about 100 feet. While the space between the broken lines of the longitude coordinates is somewhat different, the error is sufficiently small that it is considered the same as that of the latitude.

Figure 2B:
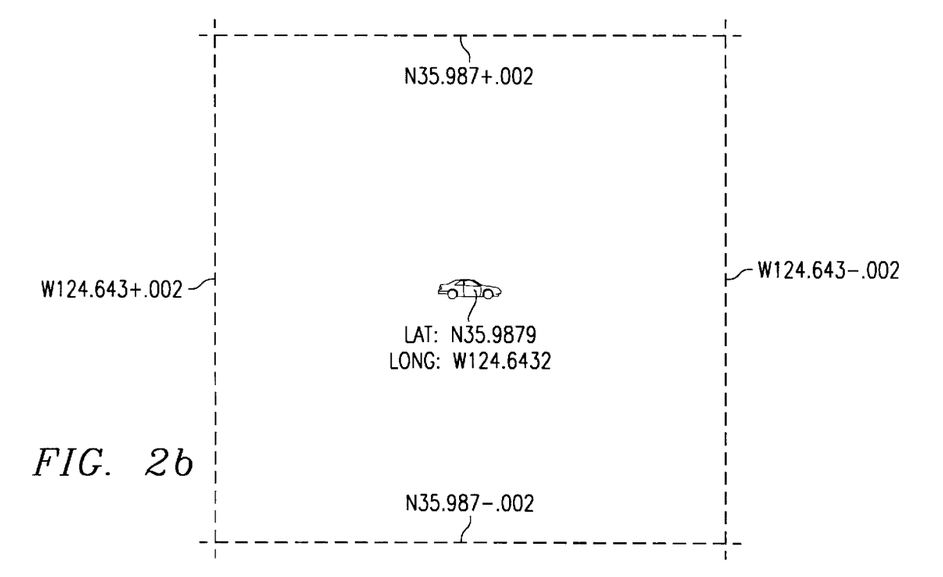

FIG. 2b illustrates an example when the speed of the vehicle is between 40 mph and 59 mph, where the dither number is 0.002. Here the range between the longitude and latitude coordinates is further increased, which corresponds to an increase in speed. By changing the longitude and latitude coordinates by ±0.002, the radius of protection around the vehicle is greater than that shown in FIG. 2a, for a slower speed vehicle. As can be appreciated, by utilizing the table of FIG. 5, a vehicle with a higher speed results in a greater radius of protection. Those skilled in the art may prefer to utilize other techniques for correlating the speed of the vehicle to the area of protection associated with the vehicle.

Program flow block 70 shows the reading of the data base memory by the GPS processor 12. Preferably, the GPS processor 12 is programmed to select a narrow range of memory addresses so as to read a relatively few grade crossing location data that closely corresponds to the location of the vehicle. This is because the cache memory of the GPS processor 12 is smaller than the data base memory 30. It is realized that the number of railroad grade crossings in the United States is about 300,000. In order to read the data base memory 300,000 times and process such information in a short period of time, an expensive and high speed processor would be required. According to the processor utilized in the present invention, only a small section of the data base memory is read, which section is selected to have stored therein the coordinates of railroad crossings which closely correspond to the location of the vehicle. Assuming for example the vehicle location coordinates are dithered by ±+0.001 (FIG. 2a), the processor 12 reads the data base memory 30 starting where the latitude coordinates are N35.986 and continuing where the latitude coordinates are N35.988. It is noted that the grade crossing coordinates are stored in the data base memory in ascending latitude numbers. Various other techniques can be utilized to select memory addresses for accessing those grade crossing locations that are in the vicinity of the vehicle. For example, yet another table (not shown) can be utilized to correlate ranges of latitude and longitude coordinates with memory addresses. The area of the United States, for example, could be segmented in a grid network of 250 miles square. The coordinates of the railroad crossings in each grid could be stored in the data base memory 30 between specified addresses. In correlating the longitude and latitude coordinates of the vehicle with geographical grids, the corresponding addresses of data base memory 30 could be readily accessed to read the grade crossing locations that are in the same grid in which the vehicle is located.

Figure 4:
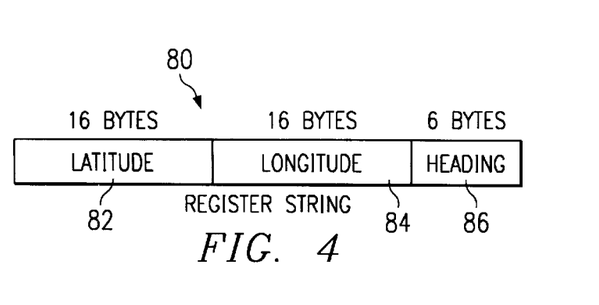
FIG. 4 illustrates a register string of data stored in the data base memory for each railroad grade crossing.
Figure 5:
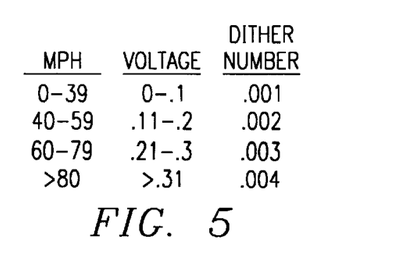
FIG. 5 is a table used by the system for correlating a vehicle speed with a dither number.

FIG. 4 illustrates the format of the data stored at each memory location of the data base memory 30. FIG. 4 shows a register string 80 which includes sixteen bytes 82 for storing a latitude coordinate of a grade crossing, a sixteen-byte area 84 for storing a longitude coordinate, and a six-byte area 86 for storing heading information corresponding to the direction of the road that crosses the grade crossing. In the preferred form of the invention, the latitude and longitude coordinates are stored with a full four bits to the right of the decimal point. While two bytes in the heading field 86 are sufficient for a compass direction, two bytes are utilized to specify one road direction, and two other bytes store the opposite direction of the road. For example, if there exists a North-South road that intersects with the railroad crossing, then the designations for both North and South would be written into the respective bytes of the heading string field 86. The fifth and sixth bytes of the heading string 86 can be used to store a heading of a one-way service road that runs parallel to the railroad tracks, where the service road then crosses the road that intersects with the railroad. In this instance, a match of the heading of the vehicle and train will occur, even through the service road runs parallel to the railroad tracks. However, a potential still exists for a collision if the vehicle turns off the service road onto the road that crosses the tracks. The data stored in the heading fields 86 corresponds to the eight-point cardinal system.

Alternatively, and to increase the accuracy, compass degrees of the direction of the road could be stored in the register string 80, in association with the latitude and longitude coordinates. Lastly, in the event that numerous and complicated road directions are associated with the grade crossing, the designation "OF" can be stored in the heading area 86. This designation indicates to the GPS processor 12 that the heading of the road (s) should be disregarded. Essentially, when a register string 80 read from the data base memory 30 has a heading string of "OF", an alert or warning can be provided irrespective of the direction of travel of the vehicle. Stated another way, a heading designation of "OF" makes the heading of the vehicle irrelevant.

In the preferred embodiment, the register string 80 is stored in the data base memory 30 for each grade crossing in the following format:

N35,98.7985,, W124,64.3255,, OE, OB where the first eleven characters represent the latitude, the next twelve characters starting with "W" represent the longitude, and the last two pairs of letters represent directional headings. The directional headings are:

NORTH="0E"
NORTHWEST="0C"
WEST="0D"
SOUTHWEST="09"
SOUTH="0B"
SOUTHEAST="03"
EAST="07"
NORTHEAST="06"
ANY DIR="0F"

Figure 3A:
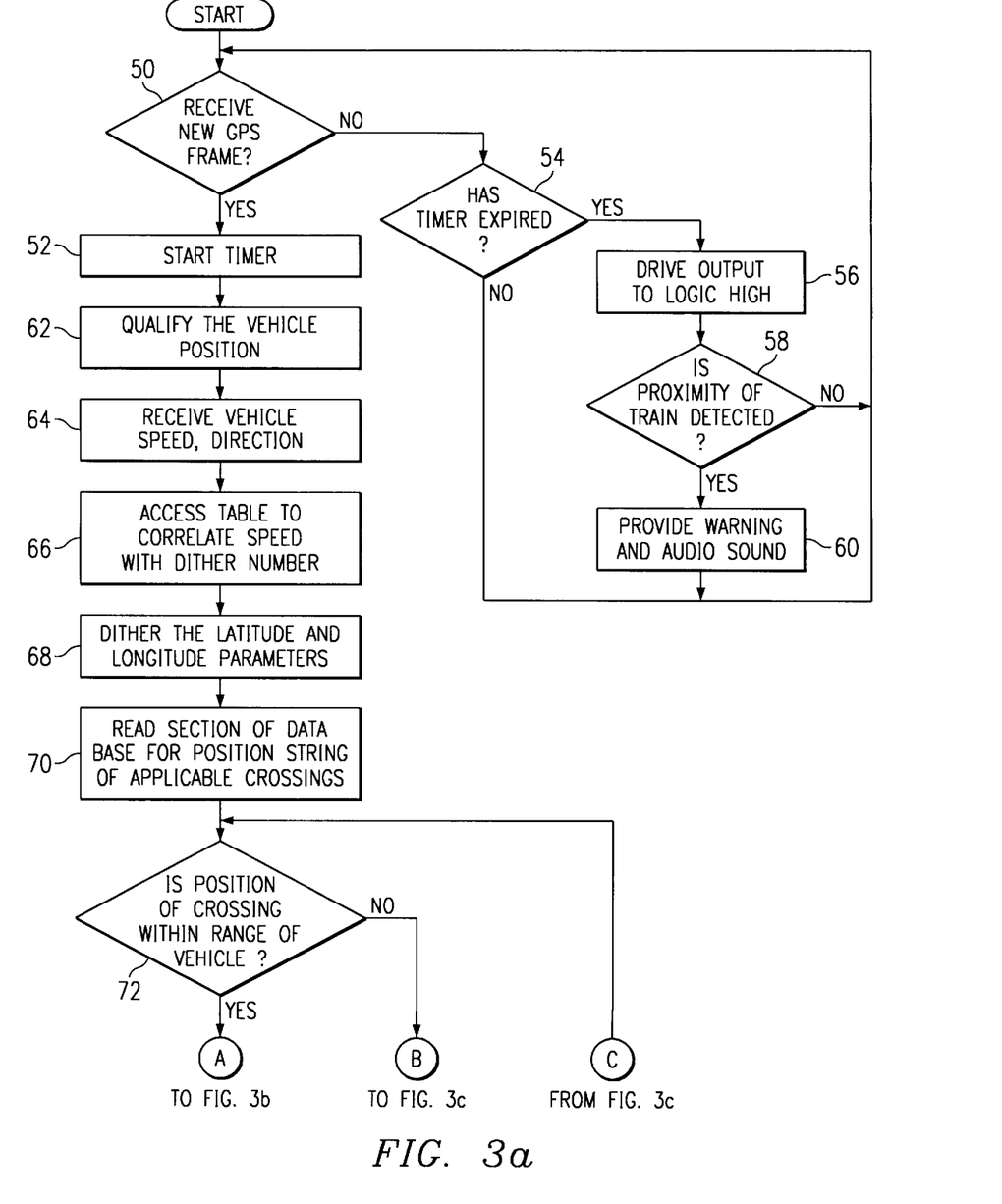
FIGS. 3a, 3b and 3c constitute a software flow chart illustrating the programmed operations of the GPS processor.

After proceeding through program flow block 70 of FIG. 3a, the GPS processor 12 has available the dithered area of protection of the vehicle and the section of the data base memory 30 storing the coordinates of railroad crossings in the vicinity of the vehicle. In processing the instructions corresponding to decision block 72, the GPS processor 12 compares the data of the first position string read from the data base 30 to determine if it falls within the area of protection, such as shown by the broken line of FIG. 2a. This assumes that the speed of the vehicle was 35 mph, and the dither number is +0.001. For this vehicle speed, the function of decision block 72 determines if a railroad grade crossing is sufficiently close to the vehicle such as to provide an indication of the same to the operator. By utilizing rudimentary mathematical operations, the GPS processor 12 determines whether or not the latitude coordinate of the register string 80 falls within N35.986 and N35.988. It is also determined whether the longitude coordinate of the register string 80 falls within W124.642 and W124.644, again as noted in FIG. 2a. If both the latitude and the longitude coordinates of the register string 80 do not both fall within the dithered coordinates, processing branches from decision block 72 to decision block 74 of FIG. 3c. In decision block 74, it is determined whether all relevant sections of the data base 30 have already been read. If all relevant sections of the memory have been read, it can be concluded that there is no grade crossing in the area of protection of the vehicle, whereupon processing returns to the start, as shown in FIG. 3a. On the other hand, if all sections of the data base memory have not been read, the GPS processor 12 reads another contiguous section of memory, as shown in program flow block 76. The contiguous register strings 80 that are read include a sufficient number of bytes of memory data such that the cache memory overflows. There may be instances where the railroad grade crossings are dense, per unit of geographical area. In the example of FIG. 2a, the cache memory may overflow before all register strings of data corresponding to latitudes between N35.986 and N35.988 can be written into the cache memory. In this instance, the remaining sections of the data base memory that include latitude coordinates between the two limits are thereafter read and temporarily stored in the cache memory. The vehicle location coordinates are then sequentially compared to the register strings in the cache memory. This operation continues until all of the register strings having latitude coordinates between N35.986 and N35.988 have been read from the data base 30 and compared with the vehicle position coordinates. The process then proceeds again with decision block 72 to determine if any of the grade crossings read from the data base 30 are within range of the vehicle.

To reiterate briefly, at higher vehicle speeds, the dither number is larger, and thus the area of protection around the vehicle, such as shown in FIG. 2b is greater. With a greater area, it is more likely that there will be a match between the latitude and longitude coordinates of a register string 80 within the area of protection. As such, a greater distance thus exists between the vehicle and the grade crossing before a warning or indication is provided to the operator of the vehicle.

Figure 3B:
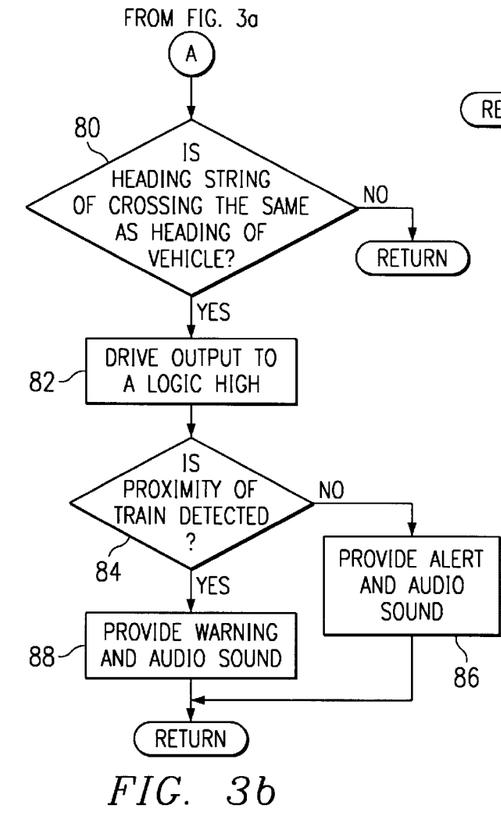
Figure 3C:
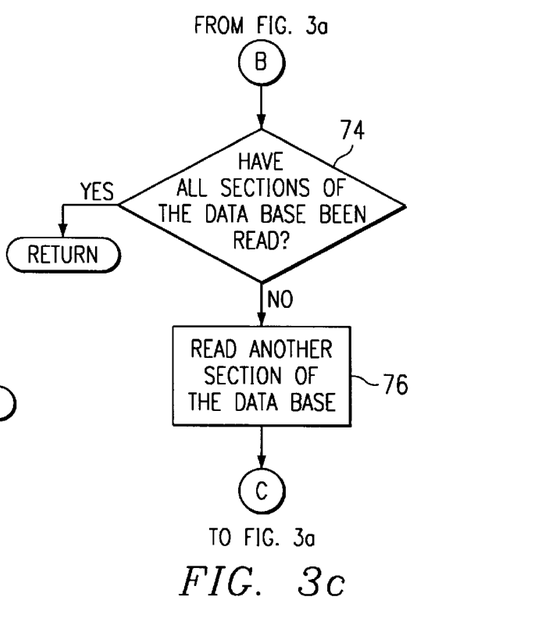

In the event that both the latitude and longitude coordinates of a register string 80 are found to lie within the area of protection, processing branches from decision block 72 to decision block 80 of FIG. 3b. The instructions carried out by the GPS processor 12 in connection with decision block 80 cause a comparison between the heading field 86 of the register string 80, and the heading of the vehicle. As noted above, the heading of the vehicle is provided by the electronic compass 22. It is significant to note that a match occurs when the heading of the vehicle is similar to the direction or heading of the road that intersects the grade crossing. In addition, a match also exists if the heading of the vehicle is opposite, or 180 degrees, from the heading data stored in the heading field 86 of the register string 80. In other words, irrespective of whether the vehicle is approaching the railroad crossing or heading away from the crossing, a match will nevertheless be found. A match provides an indication that the vehicle is not only in the vicinity of a grade crossing, but is also on the very road that intersects the crossing. Because of the variances in the accuracy of compass readings, the GPS processor 12 can be programmed to find a match in the vehicle and road headings, despite a difference of ±10 degrees, or so. Those skilled in the art may prefer to refine this comparison by determining whether the distance between the grade crossing and the vehicle is decreasing or increasing. If the distance is decreasing, this necessarily means that the vehicle is approaching the grade crossing. On the other hand, if the distance therebetween is increasing, this means that the vehicle has passed the grade crossing and is headed in the opposite direction, and is no longer in danger of a collision. Other techniques may be utilized to determine if the vehicle is approaching or headed away from the grade crossing.

From decision block 80, the GPS processor 12 drives the output line 16 to a logic high, as noted in block 82. This signals the train proximity detector that a potential exists for a collision between an oncoming train, if any, and the vehicle. In decision block 84, the train proximity demodulator and processor 14 determines whether a train has been detected in the vicinity of the vehicle. If a train has not been detected as being in the vicinity of the vehicle, processing branches to block 86 where an alert indication is provided, together with an audio sound. Thus, an alert indication is provided when a grade crossing has been found to be within the area of protection of the vehicle, and the vehicle is on the same road that intersects the crossing, but when no train is in the vicinity. It should be noted that the detection of a train need not be in the same area of protection as shown by the broken lines of FIGS. 2a and 2b. This is because the detection of a transmitted train signal is merely by way of signal strength and not by way of the use of the GPS system. However, those skilled in the art may devise techniques to ascertain the distance between a train and the vehicle, based on the GPS system.

If it is determined in decision block 84 that a train is indeed in the vicinity of the vehicle, then a warning and associated audio sound are provided to the vehicle operator, as shown in program flow block 88. As noted above, the alert and warning indications are visually different. From either program flow blocks 86 or 88, processing returns to the start of the flow chart shown in FIG. 3a. Also, with more sophisticated GPS units, it is possible that the output thereof may include the location coordinates, the vehicle speed and even the heading of the vehicle. Nonetheless, disclosed is a system for avoiding collisions with trains, where the location of the vehicle is determined, an area of protection around the vehicle is ascertained, and whether any railroad crossing is within the area of protection. If these conditions are met, it is also determined whether the vehicle is on the same road that intersects the grade crossing. If so, a first indication is provided to the operator of the vehicle. If a train is in the vicinity of the crossing, then a second, more urgent, indication is provided to the operator of the vehicle.

While the preferred embodiment of the invention has been disclosed with reference to a specific collision avoidance system, and method of operation thereof, it is to be understood that many changes in detail may be made as a matter of engineering or software choices, without departing from the spirit and scope of the invention, as defined by the appended claims.

What is claimed is:

1. A train collision avoidance system, comprising:
   a data base storing train grade crossing data identifying coordinates where a railroad track intersects with a road and for each train grade crossing data stored, storing in association therewith road heading data indicating the heading of roads intersecting respective railroad tracks at the grade crossings;
   a processor programmed to receive GPS vehicle location data that identifies a location of a vehicle, and programmed to use said GPS vehicle location data and said train grade crossing data to determine if the vehicle is within a predefined distance from a grade crossing;
   said processor being programmed to correlate the heading data of a road with a heading of the road vehicle; and
   said processor is programmed to provide a sensory indication when the vehicle is within the predefined distance from the grade crossing and when the road vehicle is on a road that intersects with the grade crossing.

2. The train collision avoidance system of claim 1, wherein said data base stores in association with said train grade crossing data, said road heading data that identifies a direction of a road with at least one of eight directions.

3. The train collision avoidance system of claim 2, wherein said processor is programmed to receive road vehicle heading data and compare said road vehicle heading data with the direction data stored in said data base, and if said vehicle is within the predefined distance from said grade crossing and if said vehicle direction of travel coincides with the direction data, said sensory indication is provided.

4. The train collision avoidance system of claim 2, wherein for each train grade crossing data stored in said data base, there is stored in association therewith direction data of at least one road that intersects a railroad track at a grade crossing identified by the train grade crossing data.

5. The train collision avoidance system of claim 4, wherein said train grade crossing data and said direction data are written into said data base so as to be read out together during one read operation of the data base.

6. The train collision avoidance system of claim 2, wherein said direction data comprises a range of compass degrees.

7. The train collision avoidance system of claim 1, wherein said processor is programmed to process said GPS vehicle location data so as to provide a radius of protection around the vehicle, said radius defined by said predefined distance.

8. The train collision avoidance system of claim 7, wherein said GPS vehicle location data comprises latitude and longitude coordinates, and is processed by changing a respective least significant bit thereof to reduce an accuracy of the location of the vehicle.

9. The train collision avoidance system of claim 8, wherein said processor is programmed to change a least significant bit of said longitude and a least significant bit of said latitude coordinates by adding and subtracting a predefined number.

10. The train collision avoidance system of claim 1, wherein said processor is programmed to receive vehicle speed data and to change said predefined distance as a function of the vehicle speed data.

11. A train collision avoidance system, comprising:
    a first detector for detecting a geographical location of a vehicle, not a train;
    a second detector for detecting a proximity of a train near the vehicle;
    a direction sensing device for providing data indicating a heading of the vehicle;
    a data base storing geographical coordinates of grade crossings where roads intersect respective railroad tracks;
    a processor that is programmed to compare the geographical location of the vehicle with the coordinates of the grade crossing to determine whether the vehicle is within a prescribed distance from the grade crossing; and
    said processor is programmed to provide a sensory indication when said comparison is affirmative, when said detector detects a proximity of the train near the vehicle, and when the heading of the vehicle will cause the vehicle to intersect the grade crossing.

12. The train collision avoidance system of claim 11, wherein said detector uses GPS signals to provide latitude and longitude parameters of geographical locations of the vehicle.

13. The train collision avoidance system of claim 11, wherein said second detector uses a transmitted signal from a train to detect a proximity thereof to the vehicle.

14. The train collision avoidance system of claim 11, wherein said processor is programmed to vary said prescribed distance as a function of a speed of the vehicle.

15. The train collision avoidance system of claim 11, wherein said sensory indication comprises a warning, and said processor is programmed to provide an alert sensory indication when said vehicle is detected as being within said prescribed distance from said grade crossing and a proximity of a train has not been detected.

16. The train collision avoidance system of claim 11, wherein said sensory indication comprises a visual indication, and further including an audible indication that is provided only for a predefined period of time, and then is extinguished.

17. The train collision avoidance system of claim 11, wherein said processor is programmed to process a geographical coordinate stored in said data base by modifying the geographical coordinate by changing a least significant digit thereof.

18. The train collision avoidance system of claim 17, wherein said geographical coordinate system comprises a multi-digit latitude parameter and a multi-digit longitude parameter, and said processor is programmed to dither the latitude and longitude parameters to provide said prescribed distance from said grade crossing.

19. The train collision avoidance system of claim 18, wherein said latitude and longitude parameters are dithered to different extents, as a function of a speed of the vehicle.

20. The train collision avoidance system of claim 19, wherein each said parameter is dithered by the same amount for a given speed of the vehicle.

21. The train collision avoidance system of claim 11, wherein said data base is configured to store data corresponding to geographical locations of a plurality of grade crossings that intersect respective roads, and stores in association with each said geographical location other data representing a compass direction of at least one road that intersects the railroad tracks at said grade crossing.

22. A train collision avoidance system, comprising:
    a processor programmed to process GPS coordinate data received from a satellite to determine a geographical location of a road vehicle;
    said processor programmed with a database identifying intersections where railroad tracks intersect roads;
    said processor programmed to periodically determine a geographical location of the road vehicle, and once the location of the road vehicle is determined, the processor defines an envelope of protection circumscribing the road vehicle so that said envelope of protection moves with the road vehicle;
    said processor programmed to read said database to determine if a railroad intersections lies within said envelope of protection; and
    said processor programmed to determine if a train is in a proximate area of the road vehicle, and if so, and if an intersection is within said envelope of protection, said processor is programmed to provide a warning in the road vehicle.

23. A method of avoiding a collision with a train, comprising the steps of
    providing an indication of a location of a vehicle;
    providing an indication of a direction of travel of the vehicle;
    reading from a data base, data identifying a location of one or more train grade crossings, and data identifying a heading of at least one road intersecting the train grade crossing;
    comparing the indication of the vehicle location with the location of the train grade crossing;
    comparing the indication of the direction of travel of the vehicle with the heading of at least one road intersecting the train grade crossing; and
    if the vehicle location is within a specified distance from the train grade crossing, and if the direction of travel of the vehicle corresponds to the heading of the road, providing a sensory indication of a potential for a collision between the train and the vehicle.

* * * * *